United States Patent [19]
Blumenthal

[11] Patent Number: 5,863,066
[45] Date of Patent: Jan. 26, 1999

[54] MULTIPLE STAGE AIR BAG INFLATOR

[75] Inventor: Jack L. Blumenthal, Los Angeles, Calif.

[73] Assignee: TRW Vehicle Safety Systems Inc., Lyndhurst, Ohio

[21] Appl. No.: 816,982

[22] Filed: Mar. 13, 1997

[51] Int. Cl.⁶ ............................................. B60R 21/26
[52] U.S. Cl. ..................... 280/737; 280/740; 280/741; 102/531; 222/3
[58] Field of Search .................................. 280/736, 737, 280/740, 741, 742; 222/3; 102/530, 531; 137/68.13

[56] References Cited

U.S. PATENT DOCUMENTS

| | | | |
|---|---|---|---|
| 5,016,914 | 5/1991 | Faigle et al. | 280/741 |
| 5,033,772 | 7/1991 | Frantom et al. | 280/737 |
| 5,060,973 | 10/1991 | Giovanetti | 280/736 |
| 5,076,607 | 12/1991 | Woods et al. | 280/737 |
| 5,263,740 | 11/1993 | Frey et al. | 280/737 |
| 5,330,226 | 7/1994 | Gentry et al. | 280/736 |
| 5,335,940 | 8/1994 | Cuevas | 280/737 |
| 5,344,186 | 9/1994 | Bergerson et al. | 280/741 |
| 5,348,344 | 9/1994 | Blumenthal et al. | 280/737 |
| 5,364,127 | 11/1994 | Cuevas | 280/741 |
| 5,411,289 | 5/1995 | Smith et al. | 280/735 |
| 5,413,378 | 5/1995 | Steffens, Jr. et al. | 280/735 |
| 5,468,015 | 11/1995 | Goetz | 280/737 |
| 5,470,104 | 11/1995 | Smith et al. | 280/737 |
| 5,494,312 | 2/1996 | Rink | 280/737 |
| 5,503,429 | 4/1996 | Wallner et al. | 280/743.1 |
| 5,556,131 | 9/1996 | Bender et al. | 280/741 |
| 5,566,976 | 10/1996 | Cuevas | 280/737 |
| 5,582,425 | 12/1996 | Skanberg et al. | 280/736 |
| 5,582,428 | 12/1996 | Buchanan et al. | 280/741 |
| 5,582,806 | 12/1996 | Skanberg et al. | 280/735 |
| 5,609,361 | 3/1997 | Bergerson et al. | 280/741 |
| 5,613,702 | 3/1997 | Goetz | 280/735 |
| 5,660,413 | 8/1997 | Bergerson et al. | 280/741 |
| 5,683,104 | 11/1997 | Smith | 280/736 |
| 5,683,107 | 11/1997 | Headley et al. | 280/741 |
| 5,690,357 | 11/1997 | Cuevas | 280/737 |
| 5,711,547 | 1/1998 | Blumenthal et al. | 280/737 |

FOREIGN PATENT DOCUMENTS

SHO50-112939 9/1975 Japan.

OTHER PUBLICATIONS

Co–pending U.S. Patent application Ser. No. 08/848,074, filed May 1, 1997, entitled "Vehicle Occupant Protection Apparatus.".

Co–pending U.S. Patent application Ser. No. 08/700,564, filed Aug. 8, 1996, entitled "Inflator for an Inflatable Vehicle Occupant Protection Device".

Co–pending U.S. application Ser. No. 08/760,837, filed Dec. 5, 1996, entitled "Vehicle Occupant Protection Apparatus".

W. G. Fassnacht, et al., ASM Committee on Flash, Friction ans Stud Welding, Friction Welding, Metals Handbook, eighth edition, vol. 6 Welding and Brazing, 1971, pp. 485 and 507–518, American Society for Metals, Metals Park, Ohio 44073.

*Primary Examiner*—Peter C. English
*Attorney, Agent, or Firm*—Tarolli, Sundheim, Covell, Tummino & Szabo

[57] ABSTRACT

An apparatus for deploying an inflatable vehicle occupant protection device includes a container (302) defining a primary combustion chamber (333), a secondary combustion chamber (343), and a gas flow path (312) extending from the primary combustion chamber (333) to the exterior (345) of the container (302) through the secondary combustion chamber (343). The container (302) has first and second opposite end walls (308, 310), and further has inner and outer tubular wall structures (304, 306) extending longitudinally from one to the other of the end walls (308, 310). The secondary combustion chamber (343) has an annular shape defined between the tubular wall structures (304, 306). The primary combustion chamber (333) is one of a pair of primary combustion chambers (333, 335) having cylindrical shapes defined within the inner tubular wall structure (304). Each primary combustion chamber (333, 335) contains a combustible mixture of gases under pressure and is separated from the secondary combustion chamber (343) by a corresponding rupturable closure part (316) of the container (302).

17 Claims, 3 Drawing Sheets

5,863,066

MULTIPLE STAGE AIR BAG INFLATOR

FIELD OF THE INVENTION

The present invention relates to an apparatus for deploying an inflatable vehicle occupant protection device.

BACKGROUND OF THE INVENTION

An inflatable vehicle occupant protection device, such as an air bag, is deployed upon the occurrence of a vehicle crash. The air bag is part of a vehicle occupant protection apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment. When the air bag is deployed in this manner, it helps to protect an occupant of the vehicle from a forceful impact with parts of the vehicle as a result of the crash.

A particular type of air bag inflator contains inflation fluid under pressure. Such an inflator is disclosed in U.S. Pat. No. 5,348,344. In the inflator disclosed in the '344 patent, the inflation fluid is an ingredient in a mixture of gases. The mixture of gases further includes a fuel gas which, when ignited, heats the inflation fluid.

The inflator has an igniter containing a small charge of pyrotechnic material. When the air bag is to be inflated, the igniter is actuated electrically. The pyrotechnic material is then ignited and produces combustion products which, in turn, ignite the fuel gas. The fluid pressure inside the inflator is increased by the heat generated upon combustion of the fuel gas. The inflation fluid then flows outward from the inflator and into the air bag to inflate the air bag more quickly than if the inflation fluid had not been heated and further pressurized.

The manner in which the inflating air bag affects movement of the vehicle occupant can be influenced by factors such as the force with which the occupant moves against the air bag and the pressure of the inflation fluid in the air bag. Those factors, in turn, can be influenced by vehicle conditions such as the severity of the crash, and/or by vehicle occupant conditions such as the size, weight and position of the occupant.

SUMMARY OF THE INVENTION

In accordance with the present invention, an apparatus for deploying an inflatable vehicle occupant protection device includes a container defining a primary combustion chamber, a secondary combustion chamber, and a gas flow path extending from the primary combustion chamber to the exterior of the container through the secondary combustion chamber. The container has first and second opposite end walls, and further has inner and outer tubular wall structures extending longitudinally from one to the other of the end walls. The secondary combustion chamber has an annular shape defined between the tubular wall structures. The primary combustion chamber is one of a pair of primary combustion chambers having cylindrical shapes defined within the inner tubular wall structure. Each primary combustion chamber contains a combustible mixture of gases under pressure and is separated from the secondary combustion chamber by a corresponding rupturable closure part of the container.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
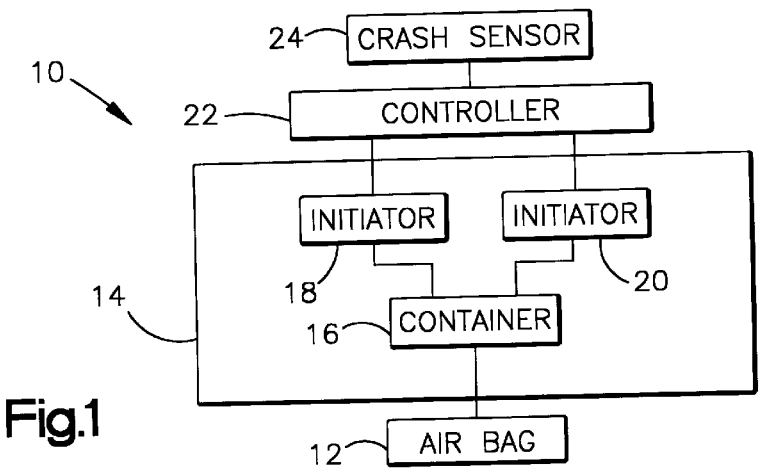
FIG. 1 is a schematic view of a vehicle occupant protection apparatus comprising a first embodiment of the invention.

A vehicle occupant protection apparatus 10 comprising a first embodiment of the present invention is shown schematically in FIG. 1. The apparatus 10 includes an inflatable vehicle occupant protection device 12. In the first embodiment of the invention, the protection device 12 is an air bag. Other inflatable vehicle occupant protection devices that can be used in accordance with the invention include, for example, inflatable seat belts, inflatable knee bolsters, inflatable head liners or side curtains, and knee bolsters operated by inflatable air bags. The apparatus 10 further includes an inflator 14 which comprises a source of inflation fluid for inflating the air bag 12. When the air bag 12 is inflated, it extends into a vehicle occupant compartment (not shown) to help protect a vehicle occupant from a forceful impact with parts of the vehicle as a result of a crash.

The inflator 14 comprises a container 16 which stores pressurized inflation fluid for inflating the air bag 12. The container 16 also stores ignitable material for heating the inflation fluid. Specifically, the container 16 in the first embodiment of the present invention stores a pressurized, combustible mixture of gases including a primary gas and a fuel gas. The primary gas comprises the majority of the inflation fluid that inflates the air bag 12. The fuel gas, when ignited, heats the primary gas.

The inflator 14 further includes first and second initiators 18 and 20 which are actuatable separately from each other. The first initiator 18, when actuated, ignites the fuel gas in the combustible mixture of gases. The second initiator 20, when actuated, also ignites the fuel gas in the combustible mixture of gases. A controller 22 actuates the initiators 18 and 20 in response to a deployment signal received from a crash sensor 24. When the fuel gas has been ignited upon actuation of the initiators 18 and 20, the heat generated by combustion of the fuel gas causes the pressure of the inflation fluid to increase rapidly to elevated levels that are substantially greater than the storage pressure. The greater pressure levels attained by the inflation fluid cause it to flow from the container 16 to the air bag 12 at correspondingly greater flow rates.

The combustible mixture of gases may have any suitable composition known in the art, but preferably has a composition in accordance with the invention set forth in U.S. Pat. No. 5,348,344, to Blumenthal et al., entitled APPARATUS FOR INFLATING A VEHICLE OCCUPANT RESTRAINT USING A MIXTURE OF GASES, and assigned to TRW Vehicle Safety Systems Inc. Accordingly, the primary gas preferably includes an inert gas for inflating the air bag and an oxidizer gas for supporting combustion of the fuel gas. The primary gas may include air, an inert gas, or a mixture of air and an inert gas. The inert gas may be nitrogen, argon or a mixture of nitrogen and argon. For example, the primary gas may be air, with the oxidizer gas being the oxygen in the air. The fuel gas may be hydrogen, methane, or a mixture of hydrogen and methane. Preferably, the fuel gas is hydrogen. A preferred composition of the mixture of gases is about 12% by volume hydrogen and about 88% by volume air. Although the storage pressure may vary, it is preferably within the range of approximately 1,500 psig to approximately 5,000 psig., and is most preferably approximately 2,500 psig.

The crash sensor 24 is a known device which senses a vehicle condition that indicates the occurrence of a crash. If the vehicle condition sensed by the crash sensor 24 is at or above a predetermined threshold level, it indicates the occurrence of a crash having at least a predetermined threshold level of severity. The threshold level of crash severity is a level at which inflation of the air bag 12 is desired for protection of a vehicle occupant. The crash sensor 24 then provides the controller 22 with a deployment signal.

The vehicle condition sensed by the crash sensor 24 preferably comprises sudden vehicle deceleration that is caused by a collision. The magnitude and duration of the deceleration are measured by the crash sensor 24. If the magnitude and duration of the deceleration meet or exceed predetermined threshold levels, they indicate the occurrence of a crash that meets or exceeds the predetermined threshold level of crash severity. A deployment signal is then transmitted to the controller 22 to indicate the occurrence of such a crash. Additionally, the deployment signal has a value which indicates the degree to which the magnitude and duration of the vehicle deceleration exceed the corresponding threshold levels. The deployment signal thus indicates both the occurrence and severity of a crash for which the air bag 12 is to be inflated.

The controller 22, which may comprise a known microprocessor, preferably actuates the first initiator 18 upon receiving the deployment signal from the crash sensor 24. The controller 22 preferably actuates the second initiator 20 at a time which is determined with reference to the value of the deployment signal received from the crash sensor 24. Actuation of the first and second initiators 18 and 20, and resulting ignition of the fuel gas in the container 16, is thus timed with reference to both the occurrence and the severity of the crash. As a result, the inflation fluid flows from the container 16 to the air bag 12 at flow rates that are correlated to the severity of the crash so that the air bag 12 is deployed accordingly.

Figure 2:
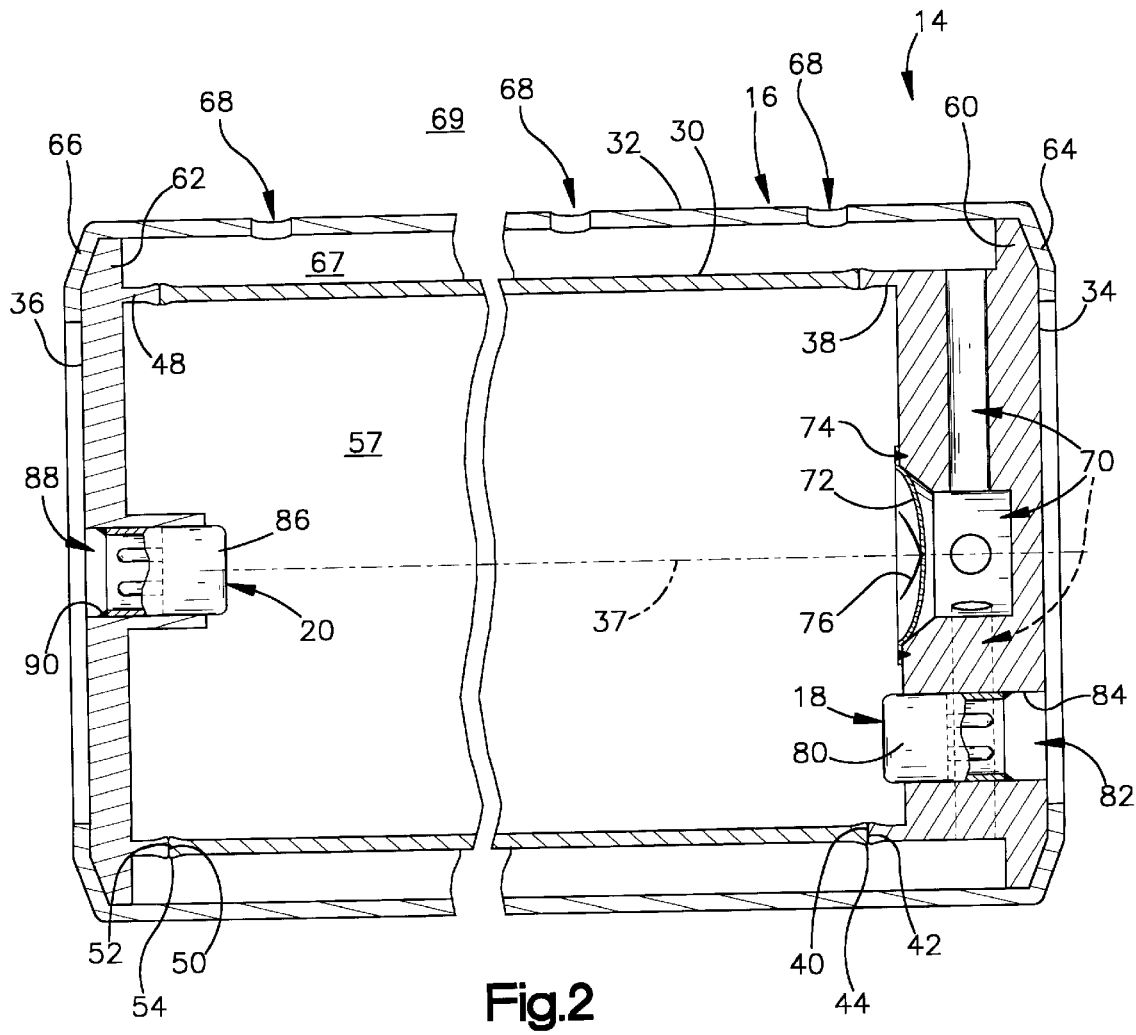
FIG. 2 is a side view, partly in section, of parts of the apparatus of FIG. 1.

In the first embodiment of the present invention, the inflator 14 has the structure shown by way of example in FIG. 2. The container 16 is an elongated cylindrical structure with an inner tubular wall 30, an outer tubular wall 32, and a pair of circular opposite end walls 34 and 36, each of which is centered on a longitudinal axis 37. Each of the container walls 30, 32, 34 and 36 may be formed of steel, aluminum, or any suitable alloy known in the art.

The first end wall 34 of the container 16 has an axially projecting rim portion 38. An annular end surface 40 of the rim portion 38 abuts an annular end surface 42 of the inner tubular wall 30. A first friction weld 44 fixes and seals the first end wall 34 and the inner tubular wall 30 together at their abutting end surfaces 40 and 42. The second end wall 36 similarly has an axially projecting rim portion 48 with an annular end surface 50 abutting an annular end surface 52 of the inner tubular wall 30. A second friction weld 54 fixes and seals the second end wall 36 and the inner tubular wall 30 together at their abutting end surfaces 50 and 52. The friction welds 44 and 54 preferably are inertia welds. However, other types of friction welds, such as conventional friction welds or flywheel friction welds, can be used as alternatives. In this configuration, the inner tubular wall 30 and the opposite end walls 34 and 36 together define a cylindrical storage chamber 57 in which the combustible mixture of gases is stored prior to actuation of either of the two initiators 18 and 20.

The opposite end walls 34 and 36 of the container 16 further have radially projecting rim portions 60 and 62, respectively. A first end portion 64 of the outer tubular wall 32 is crimped radially inward against the rim portion 60 of the first end wall 34. A second end portion 66 of the outer tubular wall 32 is crimped radially inward against the rim portion 62 of the second end wall 36. The outer tubular wall 32 is thus fixed to the opposite end walls 34 and 36 without the use of welds. In this configuration, the tubular walls 30 and 32 and the end walls 34 and 36 together define an annular gas flow space 67 surrounding the storage chamber 57.

A plurality of gas exit ports 68 in the outer tubular wall 32 communicate the gas flow space 67 directly with the ambient atmosphere 69. More specifically, the exit ports 68 are the last passages in a gas flow path extending through the inflator 14 from the storage chamber 57 to the exterior of the inflator 14. The exit ports 68 thus define end portions of that flow path which extend from the gas flow space 67 to the exterior of the inflator 14. Although a single row of the exit ports 68 is shown partially in FIG. 2, the exit ports 68 are arranged in a larger array which is suitable for diffusing the inflation gas outward from the container 16 toward the air bag 12 (FIG. 1).

As further shown in FIG. 2, the first end wall 34 of the container 16 has a plurality of fluid flow passages 70 for communicating the storage chamber 57 with the surrounding gas flow space 67. A rupturable closure part in the form of a burst disk 72 is fixed and sealed to the first end wall 34 by a circumferentially extending laser weld 74 so as to close the storage chamber 57 at the first end wall 34. The burst disk 72 has a plurality of radially extending score lines 76. The score lines 76 define stress risers that rupture under stress induced by the force of the fluid pressure acting outward from the storage chamber 57 when the fluid pressure reaches a predetermined elevated level.

The first initiator 18 is a particular type of electrically actuatable igniter which is known as a squib. The first initiator 18 thus has a cylindrical casing 80 containing a small charge of pyrotechnic material. The casing 80 fits closely within a cylindrical bore 82 extending axially through the first end wall 34 of the container 16. A TIG weld 84 fixes and seals the casing 80 to the first end wall 34. The second initiator 20 also is a squib with a cylindrical casing 86, and fits closely within a cylindrical bore 88 in the second end wall 36 of the container 16. Another TIG weld 90 fixes and seals the casing 86 to the second end wall 36. Alternatively, either or both of the initiators 18 and 20 could be supported on an end wall of the container 16 in accordance with the invention disclosed and claimed in co-pending U.S. patent application Ser. No. 08/700,564, filed Aug. 8, 1996, entitled INFLATOR FOR AN INFLATABLE VEHICLE OCCUPANT PROTECTION DEVICE; in accordance with the invention disclosed and claimed in co-pending U.S. patent application Ser. No. 08/518,825, filed Aug. 24, 1995, entitled INFLATOR FOR AN INFLATABLE VEHICLE OCCUPANT RESTRAINT; in accordance with the invention disclosed and claimed in co-pending U.S. patent application Ser. No. 08/842,148 filed Apr. 23, 1997 entitled INFLATOR FOR AN INFLATABLE VEHICLE OCCUPANT PROTECTION DEVICE (attorney docket No. TRW(AP)-3390); or in any suitable manner known in the art.

When the first initiator 18 is actuated, the pyrotechnic material in the casing 80 is ignited and produces combustion products including heat and hot particles. The combustion products are spewed directly from the casing 80 into the storage chamber 57 to ignite the fuel gas in the storage chamber 57. This causes the temperature and fluid pressure in the storage chamber 57 to increase to elevated levels, as described above. When the increasing fluid pressure reaches the predetermined elevated level at which it ruptures the burst disk 72, the heated inflation gas begins to flow outward from the storage chamber 57 to the surrounding gas flow space 67 through the passages 70 in the first end wall 34. The heated inflation gas then flows outward from the inflator 14 through the exit ports 68 in the outer tubular wall 32.

When the second initiator 20 is actuated, it likewise spews combustion products directly into the storage chamber 57. Those combustion products also ignite the fuel gas and cause corresponding increases in the temperature, pressure and outlet flow rate. Accordingly, these parameters can be controlled in accordance with the present invention by controlling the timing at which the first and second initiators 18 and 20 are actuated.

More specifically, the controller 22 (FIG. 1) actuates the first and second initiators 18 and 20 in a selected one of a plurality of differing stages in response to the crash severity indicated by the deployment signal received from the crash sensor 24. The differing stages of actuation include a stage in which only one of the initiators 18 and 20 is actuated, stages in which the initiators 18 and 20 are actuated sequentially, and a stage in which the initiators 18 and 20 are actuated simultaneously.

For example, if the deployment signal indicates that the vehicle is experiencing a crash of a predetermined low severity, the controller 22 may select a stage in which only one of the initiators 18 and 20 is actuated. If the deployment signal indicates that the vehicle is experiencing a crash of a predetermined intermediate level of severity, the controller 22 may select a stage in which one of the initiators 18 and 20 is initially actuated, with the other initiator 18 or 20 being subsequently actuated after the lapse of a delay time. Such a delay time is determined by the controller 22 with reference to the intermediate level of crash severity. The controller 22 may determine the delay time by selecting from a look-up table based on empirically derived values of crash severity. The controller 22 may alternatively determine the delay time as a result of a computation based upon a predetermined functional relationship between crash severity and delay time. The delay time determined by the controller 22 may cause the subsequent actuation to occur either before or after the burst disk 72 has been ruptured as a result of the initial actuation. In any case, the delay time will affect the amount of fuel gas remaining in the storage chamber 57 when the subsequently actuated initiator is actuated, and will thus effect the increased pressure levels and outlet flow rates attained upon actuation of that initiator.

If the deployment signal indicates the occurrence of a crash having a high level of severity, the controller 22 may select a stage in which the first and second initiators 18 and 20 are actuated simultaneously, i.e., with a delay time of zero. This stage of actuation will cause the fluid pressure in the storage chamber 57 to reach elevated fluid pressure levels, including the level at which it ruptures the burst disk 72, more rapidly. This stage of actuation may also cause the fluid pressure in the storage chamber 57 to reach the maximum levels attainable, and may thus result in maximum outlet flow rates from the storage chamber 57 to the surrounding gas flow space 67.

In accordance with a particular feature of the present invention, the fuel gas is included in the combustible mixture of gases in an amount such that the storage chamber 57 functions as a primary combustion chamber in which a major portion of the fuel gas is consumed by combustion. The surrounding gas flow space 67 functions as a secondary combustion chamber in which any remaining portion of the fuel gas is substantially entirely consumed by combustion. The proportional amounts of the fuel gas consumed by combustion in the primary and secondary combustion chambers 57 and 67 may differ in the differing stages of actuation of the first and second initiators 18 and 20.

In accordance with another particular feature of the present invention, the exit ports 68 together define the smallest flow area through which the heated inflation gas must pass upon flowing from the storage chamber 57 to the ambient atmosphere 69. The exit ports 68 thus function as control orifices for controlling the flow rate at which the inflation gas enters the air bag 12 (FIG. 1).

Figure 3:
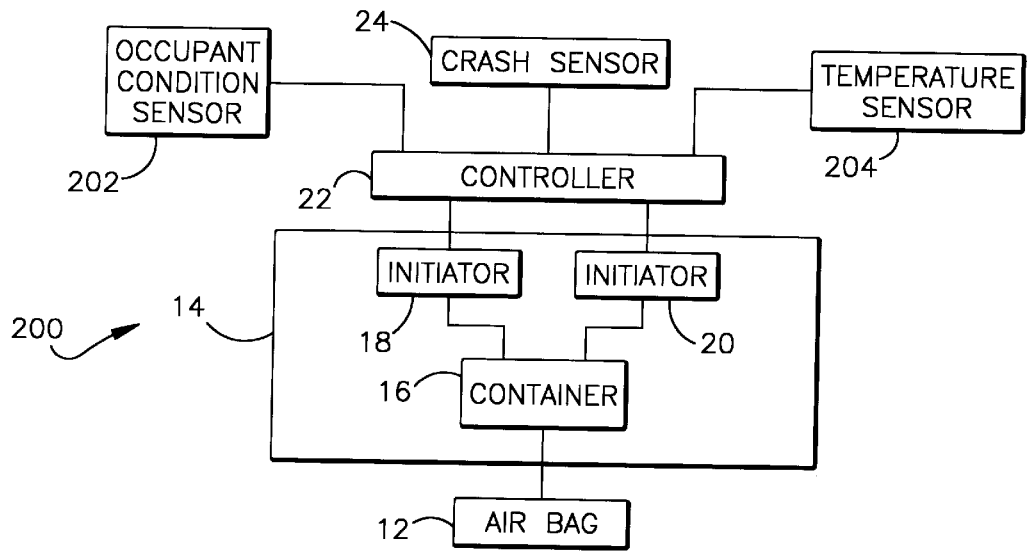
FIG. 3 is a schematic view of a vehicle occupant protection apparatus comprising a second embodiment of the invention.

A vehicle occupant protection apparatus 200 comprising a second embodiment of the present invention is shown schematically in FIG. 3. The apparatus 200 includes an occupant condition sensor 202 and a temperature sensor 204 in addition to the crash sensor 24 of FIG. 1. The apparatus 200 is otherwise the same as the apparatus 10, as indicated by the use of the same reference numbers in FIGS. 3 and 1.

The occupant condition sensor 202 may comprise any known device that provides a signal indicating a vehicle occupant condition such as, for example, an occupant's size, weight and/or position. Other vehicle occupant conditions include the occupant's presence in the vehicle and the occupant's use of a seat belt, as indicated by a seat belt buckle switch or the like. In each case, the sensor 202 provides the controller 22 with an additional deployment signal that the controller 22 uses, along with the deployment signal received from the crash sensor 24, to select a stage of actuation for the first and second initiators 18 and 20.

The temperature sensor 204 provides a deployment signal indicating the ambient temperature at the inflator 14. Since the ambient temperature at the inflator 14 can affect the pressure of the inflation fluid stored in the container 16, it can affect the flow rate at which the inflation fluid exits the container 16 upon actuation of the initiators 18 and 20. The controller 22 in the second embodiment may thus select a stage of actuation for the initiators 18 and 20 with reference to the occurrence and severity of a vehicle crash, and with further reference to a condition of a vehicle occupant and/or the ambient temperature at the inflator 14.

Figure 4:
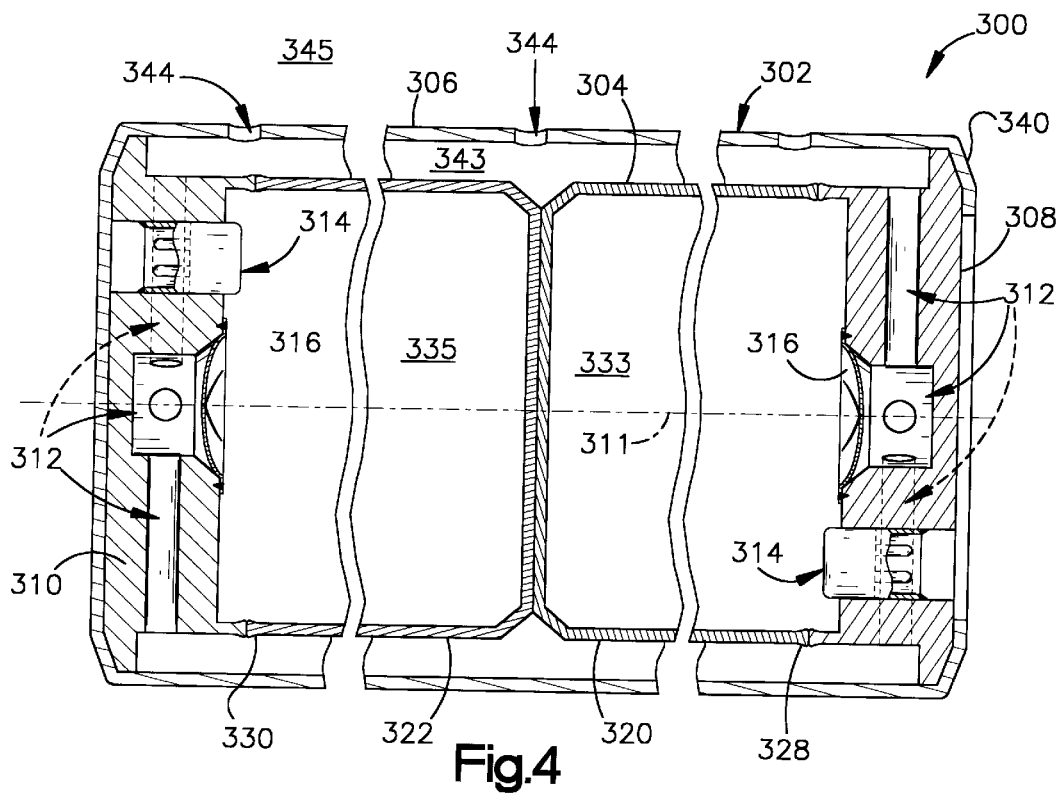
FIG. 4 is a view similar to FIG. 2 showing parts of an apparatus comprising a third embodiment of the invention.

A third embodiment of the present invention includes an alternative inflator 300 having the structure shown in FIG. 4. The inflator 300 is generally similar to the inflator 14 described above, and thus comprises an elongated cylindrical container 302 with an inner tubular wall structure 304, an outer tubular wall structure 306, and a pair of circular opposite end walls 308 and 310, each of which is centered on a longitudinal axis 311.

The end walls 308 and 310 of the container 302 are alike, and are substantially the same as the first end wall 34 of the container 16 described above. Accordingly, each end wall 308 and 310 of the container 302 has a plurality of fluid flow passages 312, and supports an electrically actuatable initiator 314 as well as a burst disk 316.

The inner tubular wall structure 304 includes first and second closed-end cylindrical tubes 320 and 322. The closed-end cylindrical tubes 320 and 322 extend oppositely from the first and second end walls 308 and 310 of the container 302, and have abutting closed end walls 324 and 326, respectively. A first friction weld 328 fixes and seals the first cylindrical tube 320 to the first end wall 308 of the container 302. A second friction weld 330 fixes and seals the second cylindrical tube 322 to the second end wall 310 of the container 302. In this configuration, the inner tubular wall structure 304 and the opposite end walls 308 and 310 of the container 302 together define first and second cylindrical storage chambers 333 and 335 which are separate from each other. Each of the storage chambers 333 and 335 stores a combustible mixture of gases like the combustible mixture of gases described above.

The outer tubular wall structure 306 of FIG. 4 is closed at one end, and at its opposite end has an end portion 340 which is crimped against the first end wall 308 of the container 302. The tubular wall structures 304 and 306 and the end walls 308 and 310 together define an annular gas flow space 343 surrounding the storage chambers 333 and 335. A plurality of gas exit ports 344 in the outer tubular wall structure 306 communicate the gas flow space 343 with the ambient atmosphere 345.

When the initiator 314 at the first end wall 308 of the container 302 is actuated, it ignites the fuel gas in the combustible mixture of gases stored in the first storage chamber 333. When the other initiator 314 at the second end wall 310 of the container 302 is actuated, it ignites the fuel gas in the combustible mixture of gases stored in the second storage chamber 335. The first and second storage chambers 333 and 335 then function as primary combustion chambers in which the fluid pressures are increased by the heat generated upon combustion of the corresponding fuel gases.

When the increasing fluid pressures in the primary combustion chambers 333 and 335 reach predetermined elevated levels, the burst disks 316 rupture in the manner described above with reference to the burst disk 72. Heated inflation fluid then flows from the primary combustion chambers 333 and 335 to the surrounding gas flow space 343 through the passages 312 in the opposite end walls 308 and 310 of the container 302. The gas flow space 343 then functions as a secondary combustion chamber in which the inflation fluid is further heated before flowing outward to the air bag through the exit ports 344.

The exit ports 344 in the container 302 preferably function as control orifices in the manner described above with reference to the exit ports 68 in the container 16. Moreover, the two initiators 314 in the third embodiment of the invention are preferably actuated by a controller in a selected one of a plurality of differing stages corresponding to a plurality of differing deployment conditions, as described above with reference to the first and second embodiments.

Figure 5:
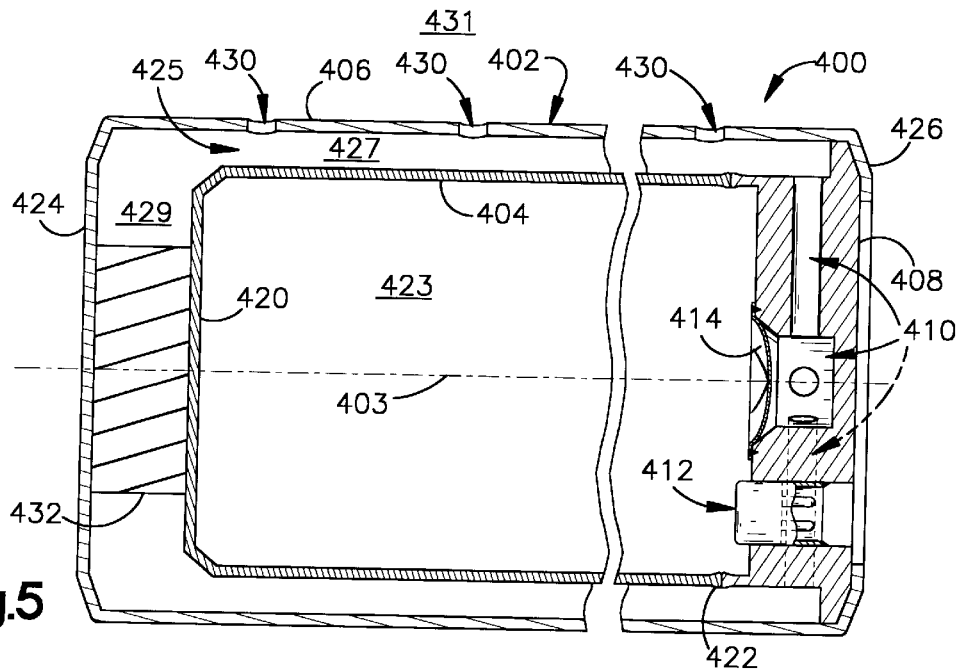
FIG. 5 is a view similar to FIG. 2 showing parts of an apparatus comprising a fourth embodiment of the invention.

A fourth embodiment of the present invention includes an alternative inflator 400 having the structure shown in FIG. 5. The inflator 400 includes a container 402 with a cylindrical shape centered on a longitudinal axis 403. The container 402 includes inner and outer tubular wall structures 404 and 406 extending longitudinally from a single circular end wall 408.

The end wall 408 of the container 402 is substantially the same as the first end wall 34 of the container 16 (FIG. 2) described above. The end wall 408 thus has a plurality of fluid flow passages 410, and also supports an electrically actuatable initiator 412 as well as a burst disk 414. The inner tubular wall structure 404 is a closed-end cylindrical tube with an end wall 420 spaced longitudinally from the end wall 408 of the container 402. A friction weld 422 fixes and seals the inner tubular wall structure 404 to the end wall 408 of the container 402. The inner tubular wall structure 404 and the end wall 408 of the container 402 together define a cylindrical storage chamber/primary combustion chamber 423 which contains a combustible mixture of gases like the combustible mixture of gases described above.

The outer tubular wall structure 406 of FIG. 5 also is a closed-end cylindrical tube, and also has an end wall 424 spaced longitudinally from the end wall 408 of the container 402. An open end portion 426 of the outer tubular wall structure 406 is crimped against the end wall 408 of the container 402. In this configuration, the end wall 408 and the tubular wall structures 404 and 406 together define a gas flow space/secondary combustion chamber 425 which is separated from the other chamber 423 by the burst disk 414. The gas flow space 425 has an axially elongated, annular portion 427 extending radially between the inner and outer tubular wall structures 404 and 406. The gas flow space 425 further has a short, cylindrical end portion 429 extending axially between the end walls 420 and 424 of the tubular wall structures 404 and 406. A plurality of gas exit ports 430 in the outer tubular wall structure 406 communicate the gas flow space 425 with the ambient atmosphere 431. The exit ports 430 preferably function as control orifices in the manner described above.

The inflator 400 of FIG. 5 further includes an elastomeric cushion 432 which is located in the end portion 429 of the gas flow space 425. The cushion 432 becomes compressively loaded axially between the end walls 420 and 424 of the tubular wall structures 404 and 406 when the outer tubular wall structure 406 is being crimped against the end wall 408 of the container 402. The cushion 432 thus helps to support the tubular wall structures 404 and 406 in their concentric relationship without the use of welds or other rigid fastening structures at the end of the container 402 opposite the end wall 408.

Figure 6:
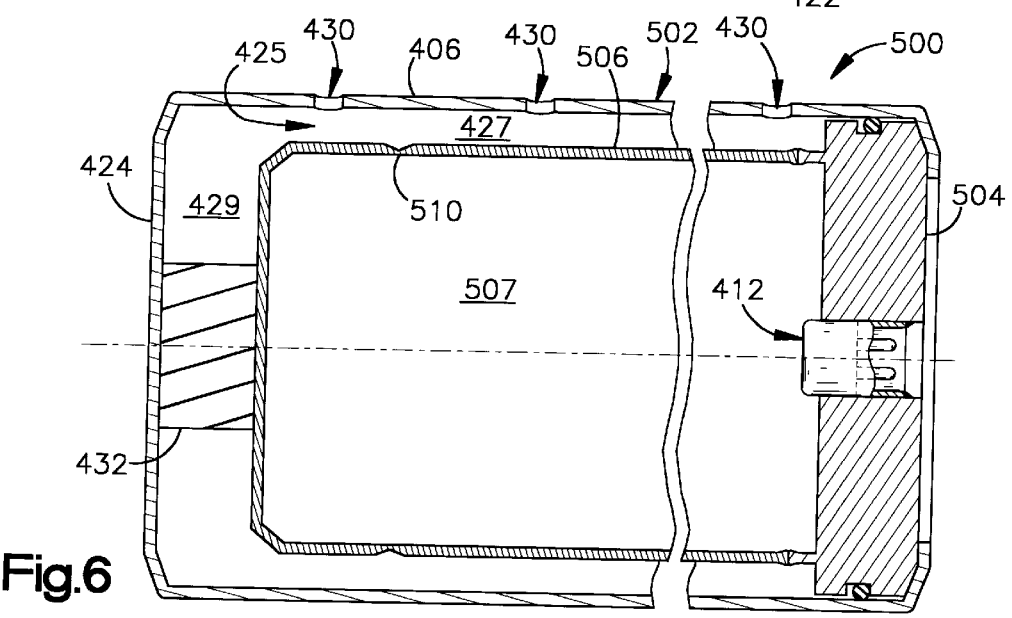
FIG. 6 is a view similar to FIG. 2 showing parts of an apparatus comprising a fifth embodiment of the invention.

In a sixth embodiment of the present invention, an alternative inflator 500 includes a container 502 with the structure shown in FIG. 6. The container 502 in the sixth embodiment has many parts that are substantially the same as corresponding parts of the container 402 in the fifth embodiment. This is indicated by the use of the same reference numbers for such corresponding parts in FIGS. 6 and 5.

The container 502 further has an end wall 504 and an inner tubular wall structure 506 which differ substantially from the corresponding parts of the container 402. Unlike the end wall 408 of the container 402, the end wall 504 of the container 502 does not have inflation fluid passages like the passages 410. Moreover, the end wall 504 does not support a rupturable closure part like the burst disk 414.

The inner tubular wall structure 506 of the container 502 is a closed-end cylindrical tube which, together with the end wall 504, defines a cylindrical storage chamber/primary combustion chamber 507 containing a combustible mixture of gases. However, the inner tubular wall structure 506 has a thinned cylindrical wall portion 510 extending circumferentially entirely around the chamber 507. The thinned wall portion 510 is a stress riser which is rupturable under stress induced by the force of a predetermined elevated level of fluid pressure acting radially outward from the chamber 507 against the inner tubular wall structure 506. The stress riser 510 thus functions as a substitute for the burst disks in the inflators described above.

Figure 7:
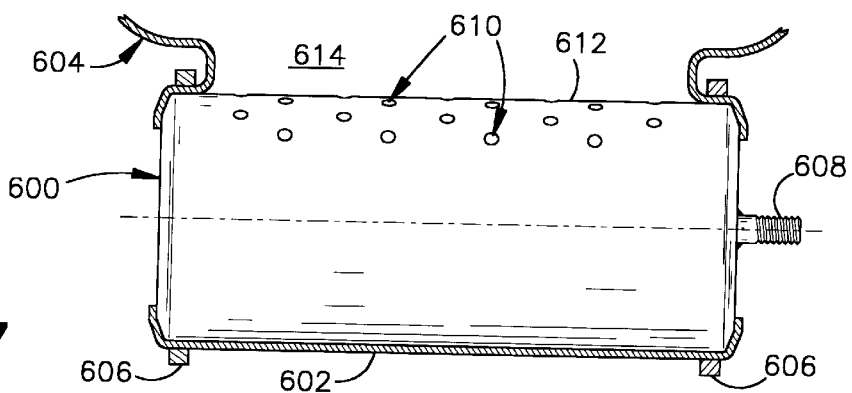
FIG. 7 is a schematic view of a vehicle occupant protection apparatus comprising a sixth embodiment of the invention.

As shown schematically in FIG. 7, an inflator 600 constructed in accordance with the present invention is preferably installed within a generally cylindrical mouth portion 602 of an air bag 604. A pair of fastening straps 606 may be used to clamp the opposite ends of the mouth portion 602 of the air bag 604 against the inflator 600. One or more mounting studs 608 may be used to support the inflator 600 on a suitable supporting structure (not shown) in a vehicle. A plurality of control orifices 610 in the outer tubular wall structure 612 of the inflator 600 communicate directly with the ambient atmosphere 614 which, as shown schematically in FIG. 7, comprises the inflatable interior volume of the air bag 604.

From the above description of the invention, those skilled in the art will perceive improvements, changes and modifications. For example, the deployment conditions sensed by the sensors 24, 202 and 204 are described by way of example only. Other vehicle or vehicle occupant conditions also could be used as deployment conditions for selecting an actuation stage for a plurality of initiators in accordance with the present invention. Such improvements, changes and modifications within the skill of the art are intended to be covered by the appended claims.

Having described the invention, the following is claimed:

1. Apparatus for deploying an inflatable vehicle occupant protection device, said apparatus comprising:

a container defining a primary combustion chamber and a secondary combustion chamber, said primary combustion chamber containing a combustible mixture of gases under pressure, said combustible mixture of gases comprising inflation gas and fuel gas for heating said inflation gas, said container having a closure part which separates said combustion chambers and which ruptures under the force of said pressure when said pressure reaches a predetermined elevated level; and an initiator which, when actuated, ignites said fuel gas to increase said pressure;

said container having an end wall with a plurality of inflation fluid passages that communicate said primary combustion chamber with said secondary combustion chamber when said closure part has been ruptured, said container further having inner and outer tubular wall structures extending longitudinally from said end wall, said primary combustion chamber being defined within said inner tubular wall structure, said secondary combustion chamber being defined between said tubular wall structures, each of said tubular wall structures comprising a closed-end cylindrical tube with an end wall spaced from said end wall of said container.

2. Apparatus as defined in claim 1 wherein said inner tubular wall structure is fixed and sealed to said end wall of said container by a friction weld, said outer tubular wall structure being fixed to said end wall of said container by a crimped end portion of said outer tubular wall structure which is free of a weld.

3. Apparatus for deploying an inflatable vehicle occupant protection device, said apparatus comprising:

a container defining a primary combustion chamber and a secondary combustion chamber, said primary combustion chamber containing a combustible mixture of gases under pressure, said combustible mixture of gases comprising inflation gas and fuel gas for heating said inflation gas, said container having a closure part which separates said combustion chambers and which ruptures under the force of said pressure when said pressure reaches a predetermined elevated level; and an initiator which, when actuated, ignites said fuel gas to increase said pressure;

said container defining a gas flow path extending from said primary combustion chamber to the exterior of said container, said container further having a plurality of inflation flow control orifices, said control orifices defining end portions of said flow path which extend from said secondary combustion chamber to said exterior of said container;

said container having first and second opposite end walls and further having inner and outer tubular wall structures extending longitudinally from one to the other of said end walls, said primary combustion chamber having a cylindrical shape defined within said inner tubular wall structure, said secondary combustion chamber having an annular shape defined between said tubular wall structures; and said primary combustion chamber being one of a pair of primary combustion chambers having cylindrical shapes defined within said inner tubular wall structure, each of said primary combustion chambers containing a combustible mixture of gases under pressure and being separated from said secondary combustion chamber by a corresponding rupturable closure part of said container.

4. Apparatus as defined in claim 3 wherein said initiator is one of a pair of initiators, each of which ignites the fuel gas in a corresponding one of said primary combustion chambers, said apparatus further comprising a controller which actuates said initiators in a selected one of a plurality of differing stages corresponding to a plurality of differing deployment conditions.

5. Apparatus as defined in claim 4 wherein said inner tubular wall structure comprises first and second closed-end cylindrical tubes extending oppositely from said first and second opposite end walls, respectively.

6. Apparatus as defined in claim 5 wherein said closed-end cylindrical tubes have abutting end walls.

7. Apparatus for deploying an inflatable vehicle occupant protection device, said apparatus comprising:

a container defining a primary combustion chamber and a secondary combustion chamber, said primary combustion chamber containing a combustible mixture of gases under pressure, said combustible mixture of gases comprising inflation gas and fuel gas for heating said inflation gas, said container having a closure part which separates said combustion chambers and which ruptures under the force of said pressure when said pressure reaches a predetermined elevated level; and an initiator which, when actuated, ignites said fuel gas to increase said pressure;

said container defining a gas flow path extending from said primary combustion chamber to the exterior of said container, said container further having a plurality of inflation flow control orifices, said control orifices defining end portions of said flow path which extend from said secondary combustion chamber to said exterior of said container;

said container having an end wall with a plurality of inflation fluid passages that communicate said primary combustion chamber with said secondary combustion chamber when said closure part has been ruptured, said container further having inner and outer tubular wall structures extending longitudinally from said end wall, said primary combustion chamber being defined within said inner tubular wall structure, said secondary combustion chamber being defined between said tubular wall structures, each of said tubular wall structures comprising a closed-end cylindrical tube with an end wall spaced from said end wall of said container.

8. Apparatus as defined in claim 7 wherein said inner tubular wall structure is fixed and sealed to said end wall of said container by a friction weld, said outer tubular wall structure being fixed to said end wall of said container by a crimped end portion of said outer tubular wall structure which is free of a weld.

9. Apparatus for deploying an inflatable vehicle occupant protection device, said apparatus comprising:

a container defining a primary combustion chamber and a secondary combustion chamber, said primary combustion chamber containing a combustible mixture of gases under pressure, said combustible mixture of gases comprising inflation gas and fuel gas for heating said inflation gas, said container having a closure part which separates said combustion chambers and which ruptures under the force of said pressure when said pressure reaches a predetermined elevated level; and an initiator which, when actuated, ignites said fuel gas to increase said pressure;

said container having first and second opposite end walls, said container further having inner and outer tubular wall structures extending longitudinally from one to the other of said end walls, said primary combustion chamber having a cylindrical shape defined within said inner tubular wall structure, said secondary combustion chamber having an annular shape defined between said tubular wall structures; and said primary combustion chamber being one of a pair of primary combustion chambers having cylindrical shapes defined within said inner tubular wall structure, each of said primary combustion chambers containing a combustible mixture of gases under pressure and being separated from said secondary combustion chamber by a corresponding rupturable closure part of said container.

10. Apparatus as defined in claim 9 wherein said initiator is one of a pair of initiators, each of which ignites the fuel gas in a corresponding one of said primary combustion chambers, said apparatus further comprising a controller which actuates said initiators in a selected one of a plurality of differing stages corresponding to a plurality of differing deployment conditions.

11. Apparatus as defined in claim 10 wherein said inner tubular wall structure comprises first and second closed-end cylindrical tubes extending oppositely from said first and second end walls, respectively.

12. Apparatus as defined in claim 11 wherein said closed-end cylindrical tubes have abutting end walls.

13. An apparatus for deploying an inflatable vehicle occupant protection device, said apparatus comprising:

a container defining a primary combustion chamber, and a secondary combustion chamber, and a gas flow path extending from said primary combustion chamber to the exterior of said container through said secondary combustion chamber;

said container having first and second opposite end walls and inner and outer tubular wall structures extending longitudinally from one to the other of said end walls;

said secondary combustion chamber having an annular shape defined between said tubular wall structures;

said primary combustion chamber being one of a pair of primary combustion chambers having cylindrical shapes defined within said inner tubular wall structure;

each of said primary combustion chambers containing a combustible mixture of gases under pressure and being separated from said secondary combustion chamber by a corresponding rupturable closure part of said container.

14. Apparatus as defined in claim 13 wherein said gas flow path is one of a pair of gas flow paths defined by said container, each of said gas flow paths extending from a corresponding one of said primary combustion chambers to said secondary combustion chamber through a corresponding one of said end walls.

15. Apparatus for deploying an inflatable vehicle occupant protection device, said apparatus comprising:

a container defining a primary combustion chamber and a secondary combustion chamber, said primary combustion chamber containing a combustible mixture of gases under pressure, said combustible mixture of gases comprising inflation gas and fuel gas for heating said inflation gas, said container having a closure part which separates said combustion chambers and which ruptures under the force of said pressure when said pressure reaches a predetermined elevated level;

said container having an end wall with a plurality of inflation fluid passages that communicate said primary combustion chamber with said secondary combustion chamber when said closure part has been ruptured, said container further having inner and outer tubular wall structures extending longitudinally from said end wall, said primary combustion chamber being defined within said inner tubular wall structure, said secondary combustion chamber being defined between said tubular wall structures, each of said tubular wall structures comprising a closed-end cylindrical tube with an end wall spaced from said end wall of said container.

16. Apparatus as defined in claim 15 wherein said inner tubular wall structure is fixed and sealed to said end wall of said container by a friction weld, said outer tubular wall structure being fixed to said end wall of said container by a crimped end portion of said outer tubular wall structure which is free of a weld.

17. Apparatus as defined in claim 16 further comprising a cushion compressively loaded by and between said end walls of said closed-end cylindrical tubes.

* * * * *